United States Patent
Pfleging et al.

(10) Patent No.: US 7,091,853 B2
(45) Date of Patent: Aug. 15, 2006

(54) X10 COMMUNICATION OF ONE OR MORE MESSAGES BETWEEN ONE OR MORE MOBILE COMMUNICATION DEVICES AND ONE OR MORE MODULE COMPONENTS

(75) Inventors: Gerald W. Pfleging, Batavia, IL (US); Rachel M. Pfleging, Batavia, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 82 days.

(21) Appl. No.: 10/733,622

(22) Filed: Dec. 11, 2003

(65) Prior Publication Data

US 2005/0128078 A1 Jun. 16, 2005

(51) Int. Cl.
*G08B 1/08* (2006.01)
*H04Q 7/00* (2006.01)

(52) U.S. Cl. .......................... 340/539.16; 340/310.01; 379/102.01

(58) Field of Classification Search ............ 340/539.16, 340/310.01, 825.69; 379/102.01
See application file for complete search history.

(56) References Cited

U.S. PATENT DOCUMENTS

| | | | | |
|---|---|---|---|---|
| 4,639,714 A | * | 1/1987 | Crowe | 340/310.02 |
| 6,005,476 A | * | 12/1999 | Valiulis | 340/310.01 |
| 6,348,875 B1 | * | 2/2002 | Odinak et al. | 340/825.52 |
| 6,405,261 B1 | * | 6/2002 | Gaucher | 709/250 |
| 6,424,660 B1 | * | 7/2002 | Jacobson, Jr. | 370/475 |
| 6,496,575 B1 | * | 12/2002 | Vasell et al. | 379/102.05 |
| 6,529,589 B1 | * | 3/2003 | Nelson et al. | 379/102.01 |
| 6,535,110 B1 | | 3/2003 | Arora et al. | |
| 6,580,950 B1 | | 6/2003 | Johnson et al. | |
| 6,587,739 B1 | * | 7/2003 | Abrams et al. | 700/83 |
| 6,798,341 B1 | * | 9/2004 | Eckel et al. | 340/521 |
| 6,807,463 B1 | * | 10/2004 | Cunningham et al. | 700/304 |
| 2002/0011923 A1 | | 1/2002 | Cunningham et al. | |
| 2002/0156860 A1 | | 10/2002 | Finke et al. | |
| 2003/0107476 A1 | | 6/2003 | Sahinoglu et al. | |

FOREIGN PATENT DOCUMENTS

| | | |
|---|---|---|
| EP | 1 182 819 | 2/2002 |
| EP | 1 233 602 | 8/2002 |

OTHER PUBLICATIONS

"What is X10?", Oct. 6, 2003, pp. 1-3, InHome Solutions, Seattle, WA, USA.
"How to contact X10", Dec. 10, 2003, pp. 1-2, InHome Solutions, Seattle, WA, USA.
Bluetooth, Dec. 10, 2003, pp. 1-2, Bluetooth SIG, Inc., Overland, KS, USA.

\* cited by examiner

*Primary Examiner*—John Tweel, Jr.

(57) ABSTRACT

One or more X10 gateway components of an apparatus in one example communicate one or more messages between one or more mobile communication devices and one or more module components.

3 Claims, 3 Drawing Sheets

X10 COMMUNICATION OF ONE OR MORE MESSAGES BETWEEN ONE OR MORE MOBILE COMMUNICATION DEVICES AND ONE OR MORE MODULE COMPONENTS

The invention relates generally to X10 technology and more particularly to communication with X10 technology.

BACKGROUND

People desire to automate a home, apartment, or office using X10 technology offered by X10 Wireless Technology, Inc. (Seattle, Wash., www.x10.com). X10 technology employs a signaling language to control one or more electrical devices through one or more electrical lines of the home, apartment, or office. One example of X10 technology is an X10 gateway component. A user employs the X10 gateway component and one or more module components to automate and/or monitor the home, apartment, or office. In one example, the user sends one or more messages to the X10 gateway component to control the electrical devices through employment of the module components. In another example, the user receives one or more messages from the X10 gateway component. For example, the user employs the messages to monitor the electrical devices at the home, apartment, or office.

The user in one example desires to communicate the messages between the X10 gateway component and the communication device from a remote location. The communication device connects to a processing center. Upon connection to the processing center, the user gives an employee of the processing center one or more messages to control the electrical devices in the home, apartment, or office. The employee sends the messages through the internet to a landline modem coupled to the X10 gateway component. The X10 gateway component obtains the messages from the landline modem to control the electrical devices.

As one shortcoming, the user can only communicate with the X10 gateway component through the processing center. For example, the user may want to communicate directly with the X10 gateway component. As another shortcoming, the X10 gateway component cannot communicate with the user of the communication device through a mobile network or a broadband internet connection.

Thus, a need exists for an X10 gateway component that communicates messages with a communication device without an intermediate processing center. A further need exists for the X10 gateway component to communicate messages with the communication device through a non-landline internet connection.

SUMMARY

The invention in one implementation encompasses an apparatus. The apparatus comprises one or more X10 gateway components that communicate one or more messages between one or more mobile communication devices and one or more module components.

Another implementation of the invention encompasses a method. A message is communicated between one or more mobile communication devices and one or more X10 module components.

A further implementation of the invention encompasses an article. The article comprises one or more computer-readable signal-bearing media. The article includes means in the one or more media for communicating a message between one or more mobile communication devices and one or more X10 module components.

DESCRIPTION OF THE DRAWINGS

Features of exemplary implementations of the invention will become apparent from the description, the claims, and the accompanying drawings in which:

DETAILED DESCRIPTION

Figure 1:
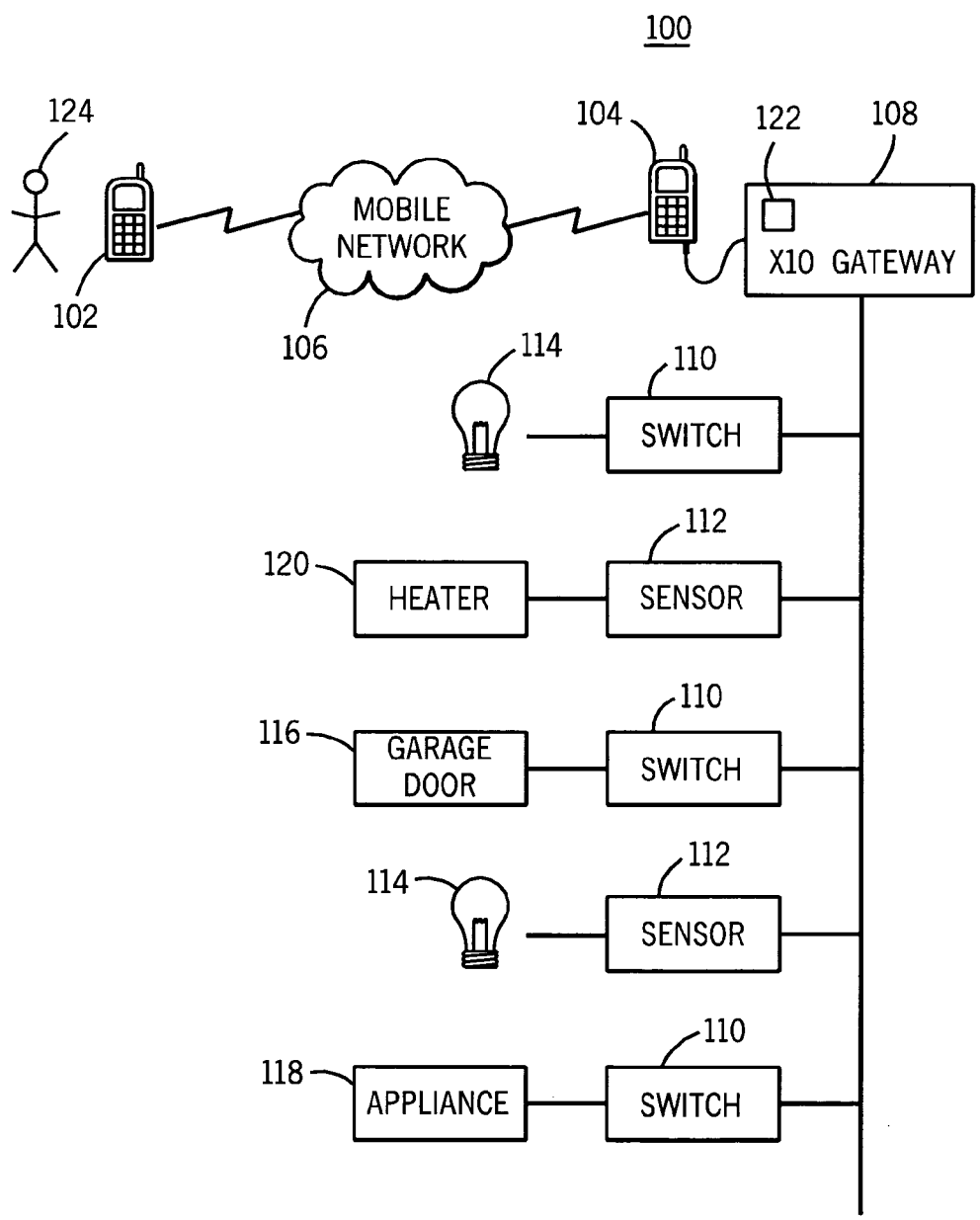
FIG. 1 is a representation of one exemplary implementation of an apparatus that comprises one or more mobile communication devices, one or more network components, one or more X10 gateway components, one or more module components, and one or more electrical devices.

Turning to FIG. 1, the apparatus 100 in one example comprises one or more mobile communication devices 102 and 104, one or more network components 106, one or more X10 gateway components 108, one or more module components 110 and 112, and one or more electrical devices 114, 116, 118, and 120. The X10 gateway components 108 communicate one or more messages between the mobile communication devices 102 and 104 and the module components 110 and 112. In one example, the X10 gateway component 108 converts the messages from the mobile communication devices 102 and 104 into one or more commands for the module components 110. In another example, the X10 gateway component 108 converts one or more responses from the module components 112 into the messages for the mobile communication devices 102 and 104.

A user 124 of the mobile communication device 102 employs the mobile communication device 102 to send the message to the X10 gateway component 108. The mobile communication devices 102 and 104 in one example comprise one or more of a mobile phone, a personal digital assistant ("PDA"), and a mobile messaging device. The messages in one example comprise one or more of a short message service message, an email, a multimedia message, and a voice message. The user 124 in one example inputs the message into the mobile communication device 102 for the X10 gateway component 108 to control one or more electrical devices 114, 116, and 118. The electrical devices 114, 116, and 118 are located at a home, office, or apartment.

In one example, the mobile communication device 102 sends the message through the network component 106 to the mobile communication device 104. The network component 106 in one example comprises a public land mobile network ("PLMN"). The mobile communication device 104 and the X10 gateway component 108 comprise one or more of a serial port connection, a universal serial bus connection, a Bluetooth® device that conforms to the Bluetooth® standard (Overland Park, Kans., http://www.bluetooth.org), and a radio frequency device. The X10 gateway component 108 in one example obtains the message from the mobile communication device 104 upon receipt of the message through the network component 106 from the mobile communication device 102. For example, the X10 gateway 108 obtains the message from the mobile communication device 104 through the serial port connection, the universal serial bus connection, the Bluetooth® device, or the radio frequency device.

Figure 2:
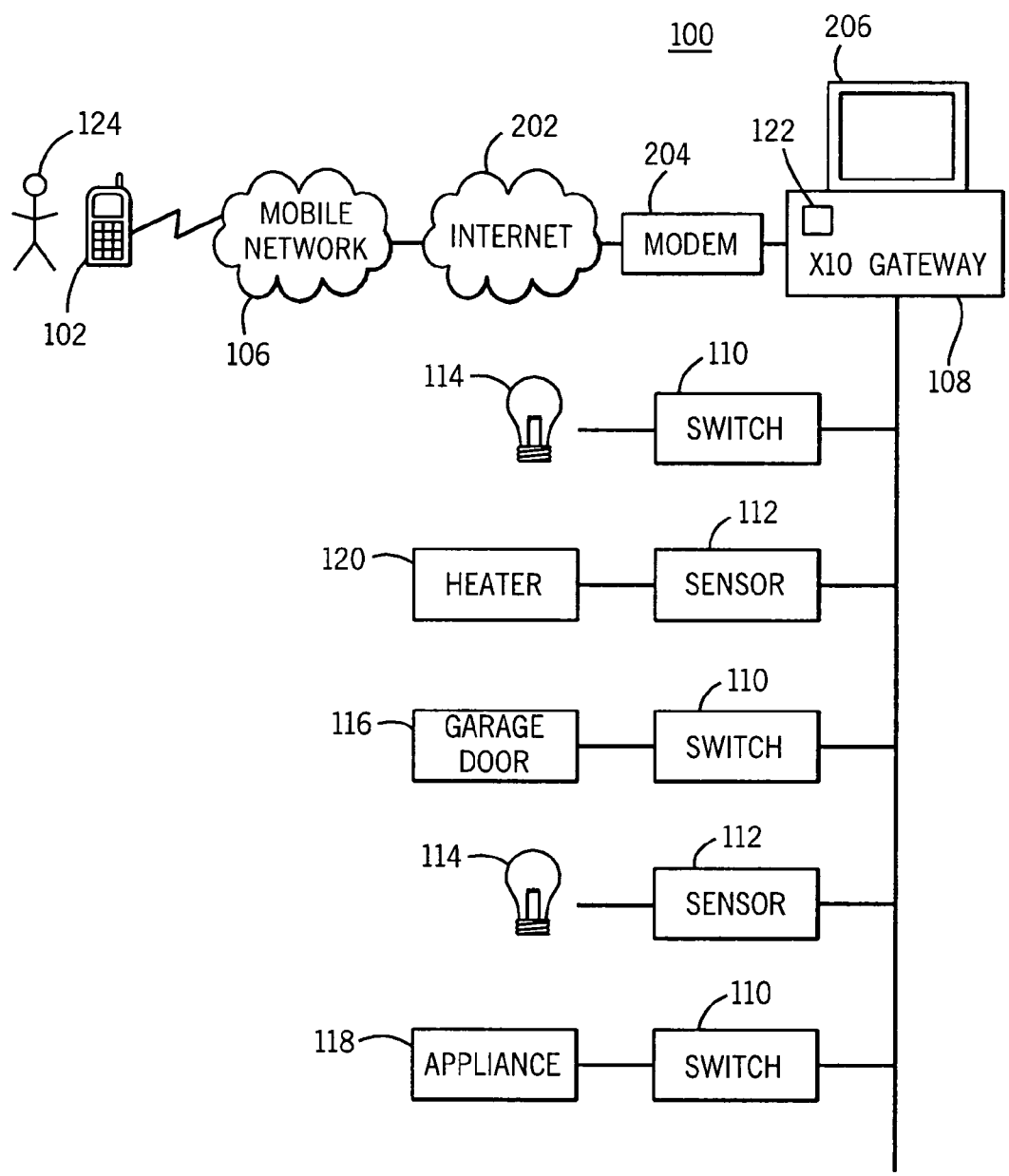
FIG. 2 is a representation of another exemplary implementation of the apparatus of FIG. 1 and further illustrates the Internet, one or more modem components, and one or more computers.

In another example, referring to FIGS. 1 and 2, the mobile communication device 102 sends the message through the Internet to the X10 gateway component 108. An implementation of the apparatus in FIG. 2 comprises the mobile devices 102, the network component 106, the X10 gateway component 108, the module components 110 and 112, the electrical devices 114, 116, 118, and 120, the Internet 202, one or more modem components 204, and one or more computers 206. The modem component 204 in one example comprises a cable modem, a digital subscriber line card, an Ethernet card, and a wireless Internet card. The computer 206 in one example comprises the X10 gateway component 108. The computer 206 in one example is coupled to the Internet 202 with the modem component 204. The X10 gateway component 108 in one example obtains the message from the modem component 204 upon receipt of the message through the Internet from the mobile communication device 102.

A user 124 of the mobile communication device 102 in one example enters a personal identification number of the user 124 with the mobile communication device 102. The mobile communication device 102 sends the personal identification number to the X10 gateway component 108 to access the X10 gateway component. Upon verification by the X10 gateway component 108 that the personal identification number corresponds to the user 124, the X10 gateway component 108 enables a receipt of the message from the mobile communication device 102 at the X10 gateway component 108.

The X10 gateway component 108 obtains the message from the mobile communication device 104 or the modem component 204. The X10 gateway component 108 in one example separates the message into one or more commands. Where the message comprises the short message service message or the email, the X10 gateway component 108 in one example parses the short message service message or the email into the commands. Where the message comprises the voice message, the X10 gateway component 108 in one example converts the voice message into a text message. Upon a conversion to the text message, the X10 gateway component 108 parses the text message into the commands. The X10 gateway component 108 comprises an instance of the recordable data storage medium 122. The commands in one example comprise one or more key words such as light on, light off, light dim, door open, door close, take picture, read temperature, heat on, air conditioner on, appliance on, and appliance off.

One or more of the module components 110 and 112 employ the commands to control one or more of the electrical devices 114, 116, 118, and 120. The module components 110 and 112 in one example comprise one or more X10 module components. The X10 gateway component 108 in one example sends the commands to the module components 110 and 112 to control the electrical devices 114, 116, and 118 with the commands. For example, the X10 gateway component 108 sends the commands through one or more AC power lines in the house, apartment, or business to the module components 110 and 112.

The module component 110 in one example comprises a switch component or a dial component. Where the commands comprise light on, light off, or light dim and the electrical device 114 comprises a light-emitting device, the module component 110 in one example dims, turns on, or turns off the electrical device 114. Where the commands comprise door open or door close and the electrical device 116 comprises a door, for example a garage door, the module component 110 in one example opens or closes the electrical device 116. Where the commands comprise appliance on or appliance off and the electrical device 118 comprises an appliance, the module component in one example turns the electrical device 118 on or off.

The module components 112 in one example send one or more messages to the X10 gateway component 108. The messages comprise one or more responses. The responses comprise one or more of a command, a picture, a video and a response message. The module components 112 in one example comprise one or more sensor components. The sensor components comprise one or more of a temperature sensor, a motion detector, a sound sensor, and a pressure sensor. The module component 112 generates a response in reaction to one or more triggers.

In one example, the module component 112 employs the command to control one or more of the electrical devices 114, 116, 118, and 120. The user 124 of the mobile communication device 102 in one example may send a message to the module component 112 through the X10 gateway component 108 for control of the electrical appliances 114, 116, 118, 120 in response to the triggers. For example, the user 124 sends the message to advise the X10 gateway component 108 to turn on the electrical device 120 in response to a temperature decrease. Where the triggers comprise the temperature decrease, the electrical device 120 comprises a heater, and the module component 112 comprises the temperature sensor, the X10 gateway component employs the module component 112 to turn on the electrical device 120 in response to the temperature decrease.

In another example the module component 112 automatically responds to the triggers. Where the triggers comprise movement, the module component 112 comprise the motion detector, and the response comprises the command,the module component 112 in one example generates the command in reaction to the movement. For example, where the module component 112 comprises the motion detector and the electrical device 114 comprises the light-emitting device, the command comprises "turn on light". The module component 112 turns the light-emitting device in response to the movement.

In still another example, where the triggers comprise heat, the module component 112 comprises a thermometer, and the response comprise the response message, the module component 112 generates the response message in reaction to the heat. The module component 112 sends the response message through the AC power lines to the X10 gateway component 108. The X10 the gateway component 108 in one example converts the response message into one or more of a voice message, a short message service message, a multimedia message and email.

In yet another example, where the triggers comprise movement,the module component 112 comprises a camera, and the response comprises the picture or the video, the module component 112generates the picture or the video in reaction to the movement. The module component 112 sends the picture or the video to the X10 gateway component 108.

Upon receipt of one or more of these response message, the picture, and the video, the X10 gateway component 108 sends one or more of the voice message, the short message service message, the email, and the multimedia message to the mobile communication device 102. In one example, the X10 gateway component 108 sends the one or more of the voice message, the short message service message, the email, and the multimedia message to the mobile communication device 104. The mobile communication device 104 sends the one or more of the voice message, the short message service message, the email, and the picture through the mobile network component 106 to the mobile communication device 102. In another example, the X10 gateway component 108 sends the one or more of the voice message, the short message service message, the email, and the picture to the modem component 204. The modem component 204 sends the one or more of the voice message, the short message service message, the email, and the picture through the Internet 202 and the network component 106 to the mobile communication device 102. The user 124 in one example employs the mobile communication device 102 to obtain the one or more of the voice message, the short message service message, the email, and the picture.

Figure 3:
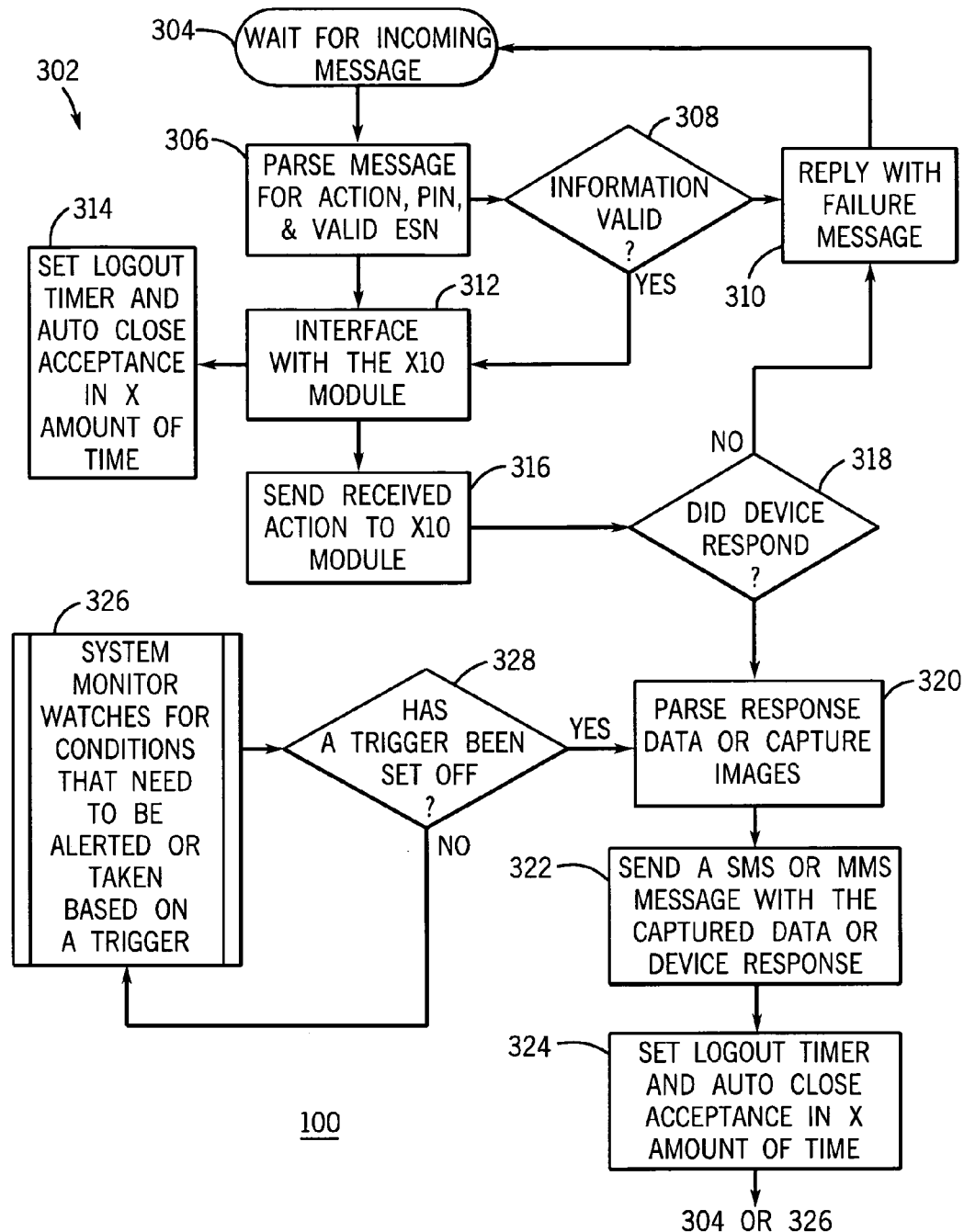
FIG. 3 is a representation of exemplary logic that serves to allow the X10 gateway component to communicate one or more messages between the mobile communication device and the module components of the apparatus of FIG. 1.

Referring to FIGS. 1–3, exemplary logic 202 serves to allow the X10 gateway component 108 of the apparatus 100 to communicate one or more messages between the mobile communication device 102 and the module components 110 and 112, The apparatus 100 converts the messages into other messages for the mobile communication device 102 and the module components 110 and 112. The logic 302 employs one or more steps, for example, STEPS 304, 306, 308, 310, 312, 316, 318, 320, 322, 324, 326, 328, and 330.

In one example, the user 124 employs the mobile communication device 102 to send the message to the X10 gateway component 108. The X10 gateway component 108 in one example separates the messages into one or more commands to control one or more electrical devices 114, 116, 118, and 120 with one or more commands. In another example, the module component 112 sends a message that comprises a response to the X10 gateway component 108. The X10 gateway component 108 in one example sends a second message that comprises information of the response to the mobile communication device 102.

While the X10 gateway component 108 is waiting to receive a message in STEP 304, the user 124 employs the mobile communication device 102 to send the message to the X10 gateway component 108 and STEP 304 proceeds to STEP 306. For example, the mobile communication device 102 may send the message through the network component 106 to the mobile communication device 104 or through the Internet 202 to the modem component 204 for receipt by the X10 gateway component 108. The message in one example comprises one or more of a command and a personal identification number. The X10 gateway component 108 in one example parses the message into the commands and personal identification number and STEP 306 proceeds to STEP 308.

The X10 gateway component 108 in one example verifies that the personal identification number corresponds to the user 124 and that the commands are valid commands. In one example, if the personal identification number does not correspond to the user 124 and/or the commands are not valid commands, then the X10 gateway component 108 STEP 308 proceeds to STEP 310. For example, the X10 gateway component 108 sends a failure message to the mobile communication device 102 and returns back to STEP 304. In another example, if the personal identification number does correspond to the user 124 and the commands are valid commands, then STEP 308 proceeds to STEP 312. For example, the X10 gateway component 108 connects to the module component 110 or the module component 112 and STEP 312 proceeds to STEPS 314 and 316.

In one example, the X10 gateway component 108 sets a logout timer for the user 124 of the mobile communication device 102. For example, the user 124 is able to send more messages to the X10 gateway component 108 until the logout timer expires, at which point the user 124 may login again by resending the personal identification number. In another example, the X10 gateway component 108 sends the commands to the module component 110 or the module component 112 and STEP 316 proceeds to STEP 318. If the module component 110 or the module component 112 does not comply with the commands, then STEP 318 proceeds back to STEP 310. If the module component 110 or the module component 112 does comply with the commands, then STEP 318 proceeds to STEP 320.

One or more of the module component 110 and the module component 112 in one example control one or more of the electrical devices 114, 116, 118, and 120 with the commands. The one or more of the module component 110 and the module component 112 in one example send a response message back to the X10 gateway component 108 and STEP 320 proceeds to STEP 322. For example, where the electrical device 120 comprises the heater and the command comprises "get temperature", the module component 112 sends the response message to the X10 gateway component 108 that comprises a temperature setting of the heater.

The X10 gateway component 108 in one example obtains the response message from the module component 110 or the module component 112. The response message in one example comprises response information. The X10 gateway component 108 in one example inserts the response information into a message that comprises one or more of a short message service message, a multimedia message, a voice message, and an email. The X10 gateway component 108 sends the message to the mobile communication device 102 and STEP 322 proceeds to STEP 324. For example, the user 124 of the mobile communication device 102 receives the one or more of a short message service message, a multimedia message, a voice message, and an email to learn the temperature setting of the electrical device 120. The X10 gateway component 108 in one example 108 sets a logout timer for the user 124 of the mobile communication device 102 if the logout timer has not already been set and STEP 324 proceeds to STEP 304 or STEP 326.

The module component 112 in one example waits for one or more triggers to proceed from STEP 326 to STEP 328. For example, where the trigger comprises movement and the electrical device 114 comprises a light bulb, the module component 112 turns on the electrical device 114 in reaction to the movement and proceeds from STEP 328 to STEP 320. Upon the reaction to the movement, the module component 110 or the module component 112 in one example sends a response message back to the X10 gateway component 108 and STEP 320 proceeds to STEP 322.

The response message in one example comprises a picture or a video. A camera, the module component 112, or the mobile communication device 104 takes the picture or the video. The X10 gateway component 108 in one example inserts the picture or the video into a message that comprises a multimedia message or an email. The X10 gateway component 108 sends the message to the mobile communication device 102 and STEP 322 proceeds to STEP 324.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 122 of the X10 gateway component 108. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:

a first X10 gateway component that communicates one or more messages between a first mobile communication device and a first module component;

wherein the one or more messages comprise a response originated by the first module component, wherein the first module component comprises a sensor component, wherein the first X10 gateway component is coupled with the first module component; wherein the first sensor component generates the response in reaction to one or more triggers, wherein the first X10 gateway component obtains the response from the sensor component;

wherein the response comprises information local to the first sensor component captured by the first sensor component, wherein the first X10 gateway component sends the corresponding information to the mobile communication device;

the first X10 gateway component comprising means for automatically terminating acceptance of information received from the first mobile communication device upon the expiration of a predetermined time period after the beginning of communication from the first mobile communication device to the first module component.

2. An apparatus, comprising: one or more X10 gateway components that communicate one or more messages between one or more mobile communication devices and one or more module components, wherein the one or more X10 gateway components comprise an X10 gateway component, wherein the one or more messages comprise a response, wherein the one or more module components comprise a sensor component, wherein the X10 gateway component is coupled with the module component; wherein the sensor component generates the response in reaction to one or more triggers, wherein the X10 gateway component obtains the response from the sensor component, wherein the response comprises information local to the sensor component sensed by the sensor component, wherein the X10 gateway component sends the information to the mobile communication device;

wherein each X10 gateway component comprises means for automatically terminating communication of information transmitted from the sensor component to one of the mobile communication devices upon the expiration of a predetermined time period after the beginning of communication from the sensor component to one of the mobile communication devices.

3. A method, comprising the step of:

communicating a message between one or more mobile communication devices and one or more X10 module components, wherein the X10 module component comprises a sensor component, wherein the step of communicating the message between the one or more mobile communication devices and the one or more X10 module components comprises the steps of:

receiving information local to the sensor component as sensed by the sensor component; sending the information to one or more of the one or more mobile communication devices; and automatically terminating communication of information transmitted from the sensor component to the one or more of the mobile communication devices upon the expiration of a predetermined time period after the beginning of communication from the sensor component to the one or more of the mobile communication devices.

* * * * *